(12) United States Patent
Qi et al.

(10) Patent No.: US 7,890,745 B2
(45) Date of Patent: Feb. 15, 2011

(54) APPARATUS AND METHOD FOR PROTECTION OF MANAGEMENT FRAMES

(75) Inventors: Emily H. Qi, Portland, OR (US); Jesse R. Walker, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1059 days.

(21) Appl. No.: 11/330,568

(22) Filed: Jan. 11, 2006

(65) Prior Publication Data

US 2007/0192832 A1    Aug. 16, 2007

(51) Int. Cl.
H04L 29/06    (2006.01)
G06F 7/04    (2006.01)
G06F 15/16    (2006.01)
H04M 1/66    (2006.01)
G06Q 20/00    (2006.01)
H04W 4/00    (2009.01)

(52) U.S. Cl. .................. 713/150; 713/151; 726/3; 455/410; 709/228; 709/237; 705/76; 370/329; 370/331

(58) Field of Classification Search .............. 713/150, 713/151; 726/3
See application file for complete search history.

(56) References Cited

U.S. PATENT DOCUMENTS

| | | | |
|---|---|---|---|
| 6,842,460 B1* | 1/2005 | Olkkonen et al. | 370/465 |
| 7,263,357 B2* | 8/2007 | Lee et al. | 455/432.1 |
| 2003/0002456 A1* | 1/2003 | Soomro et al. | 370/328 |
| 2004/0006705 A1* | 1/2004 | Walker | 713/200 |
| 2004/0136339 A1* | 7/2004 | Wentink | 370/329 |
| 2004/0240412 A1* | 12/2004 | Winget | 370/331 |
| 2005/0070317 A1 | 3/2005 | Liu | |
| 2005/0086465 A1* | 4/2005 | Sapkota et al. | 713/150 |
| 2005/0141498 A1* | 6/2005 | Cam Winget et al. | 370/389 |
| 2005/0201330 A1 | 9/2005 | Park et al. | |
| 2005/0207581 A1 | 9/2005 | Qi et al. | |
| 2005/0243769 A1 | 11/2005 | Walker et al. | |
| 2005/0254653 A1 | 11/2005 | Potashnik et al. | |
| 2006/0067526 A1* | 3/2006 | Faccin et al. | 380/46 |
| 2006/0083201 A1* | 4/2006 | He et al. | 370/331 |
| 2006/0126847 A1* | 6/2006 | Ho | 380/277 |
| 2006/0135165 A1 | 6/2006 | Faccin | |
| 2006/0164290 A1* | 7/2006 | Dawson | 342/32 |
| 2007/0162751 A1* | 7/2007 | Braskich et al. | 713/169 |
| 2008/0065888 A1 | 3/2008 | Zheng et al. | |
| 2008/0112362 A1 | 5/2008 | Korus | |
| 2008/0144579 A1 | 6/2008 | Sood | |

OTHER PUBLICATIONS

Arbaugh, et al. "Your 802.11 Wireless Network has No Clothes", Department of Computer Science University of Maryland, College Park, Maryland 20742, Mar. 30, 2001.*

He et al., "Analysis of the 802.11i 4-Way Handshake", WiSe'04, Oct. 1, 2004, Philadelphia, Pennsylvania, USA.*

(Continued)

Primary Examiner—Taghi T Arani
Assistant Examiner—Morshed Mehedi
(74) Attorney, Agent, or Firm—Schwabe, Williamson & Wyatt, P.C.

(57) ABSTRACT

In one embodiment, methods and apparatus to protect management frames are generally described herein. Other embodiments may be described and claimed.

31 Claims, 6 Drawing Sheets

OTHER PUBLICATIONS

Arbaugh, William A. et al., "Your 802.11 Wireless Network has No Clothes," Internet Citation, Mar. 30, 2001, pp. 1-13, XP002331784.
International Search Report for International Application No. PCT/US2007/000816 issued by the European Patent Office on Jun. 27, 2007, pp. 1-6.
U.S. Appl. No. 11/462,657, filed Aug. 4, 2006, Sood.
U.S. Appl. No. 11/382,814, filed May 11, 2006, Walker et al.
Networks—Specific Requirements—Par 11: Wireless LAN Medium Access Control (MAC) and Physical Layer (PHY) Specifications: Amendment 2: Fast BSS Transition, IEEE 802, Committee of the IEEE Computer Society, Nov. 2006.
Draft Amendment to Standard for Information Technology—Telecommunications and Information Exchange Between Systems—LAN/MAN Specific Requirements—IEEE P802.11r/D4.0, Nov. 2006.
Part 11: Wireless Medium Access Control (MAC) and physical layer (PHY) specifications, IEEE P802.11k/D3.0, Oct. 2005, 151 pgs.

* cited by examiner

APPARATUS AND METHOD FOR PROTECTION OF MANAGEMENT FRAMES

BACKGROUND

1. Technical Field

Embodiments of the present invention are related to the field of electronic devices, and in particular, to wireless network devices.

2. Description of Related Art

An Institute of Electrical and Electronic Engineers (IEEE) 802.11 standard (published 1999, IEEE Standards Board, Piscataway, N.Y.) and later versions and amendments (hereinafter collectively "IEEE 802.11"), define aspects of Wireless Local Area Networks (WLANs). Within this IEEE 802.11 standard, management frames are used, but currently there are no security mechanisms to protect the management frames that are sent before keys are in place. For example, Beacon frames, Probe Response frames and like management frames contain valuable wireless network information and are subject to forgery. In one illustrative case, the consequences of a forged Beacon or Probe Response frame may create a denial-of-service attack.

The current version of the IEEE 802.11 standard prevents direct protection for management frames, such as Beacon and Probe Response frames. A data link protocol may only provide frame protection after a session key is in place, which for IEEE 802.11 is after a four-way handshake. Since such management frames are sent before the four-way handshake, the management frames are not protected by using existing techniques. Under IEEE 802.11w, a working group of the IEEE currently is working on enhancements to the IEEE 802.11 Media Access (MAC) layer to increase the security of management frames.

DETAILED DESCRIPTION OF ILLUSTRATIVE EMBODIMENTS

In the following description, for purposes of explanation, numerous details are set forth in order to provide a thorough understanding of the disclosed embodiments of the present invention. However, it will be apparent to one skilled in the art that these specific details are not required in order to practice the disclosed embodiments of the present invention. In other instances, well-known electrical structures and circuits are shown in block diagram form in order not to obscure the disclosed embodiments of the present invention.

Figure 1:
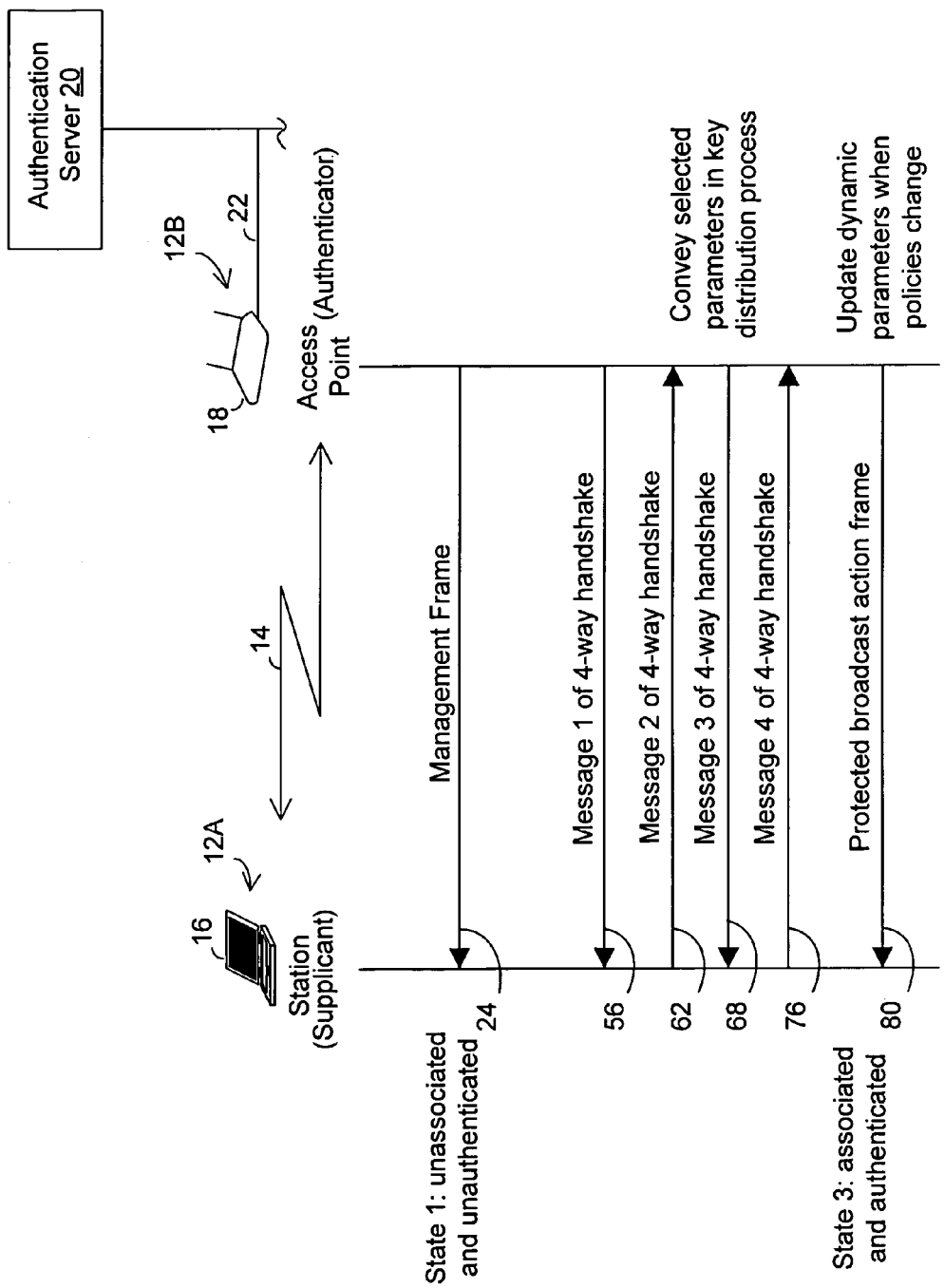
FIG. 1 illustrates a WLAN and message exchanges in the WLAN in accordance with one embodiment of the present invention.

With reference to FIG. 1, there is illustrated a WLAN 10 in accordance to one embodiment of the present invention. The WLAN 10 includes at least two devices 12A and 12B that communicate using a wireless protocol over a wireless medium 14. In one embodiment, the wireless protocol may include the IEEE 802.11 specification. In one embodiment as shown in FIG. 1, the WLAN 10 may comprise an infrastructure Basic Service Set (BSS) wherein the device 12A is a station (STA) 16 and the device 12B is an Access Point (AP) 18. In another embodiment, the WLAN 10 may include a plurality of APs 18 and one or more stations 16, in which the infrastructure BSS may be referred to as Extended Service Set (ESS). The ESS refers to a logical collection of the APs 18 operationally tied together so that one or more stations 16 may roam between APs 18. In the infrastructure embodiments, the one or more APs 18 may be coupled to an authentication server 20 via a wired backbone network 22, with the authentication server 20 being used to generate and manage keys. In another embodiment, the AP 18 may have the authentication server 20 incorporated therein. In another embodiment, the AP 18 may not make use of an authentication server and instead the station 16 and AP 18 may use preshared keys. In another embodiment, the WLAN 10 may comprise an independent BSS (sometimes referred to as an ad hoc network) having at least two stations 16 and no APs; hence both devices 12A and 12B would be stations.

In one embodiment, the station 16 may be a computing device having a wireless network interface coupled the wireless medium 14, one or more processors and one or more memories. For example, the station 16 may be a laptop computer, a personal computer, a portable hand-held computer, a personal digital assistant, a network enabled cellular phone or like device. The AP 18 may be a base station or like device having a wireless network interface coupled to the wireless medium, one or more processors and one or more memories. The AP 18 may be capable of performing at least a wireless-to-wired bridging function between the wireless medium 14 and the wired backbone network 22.

Figure 2:
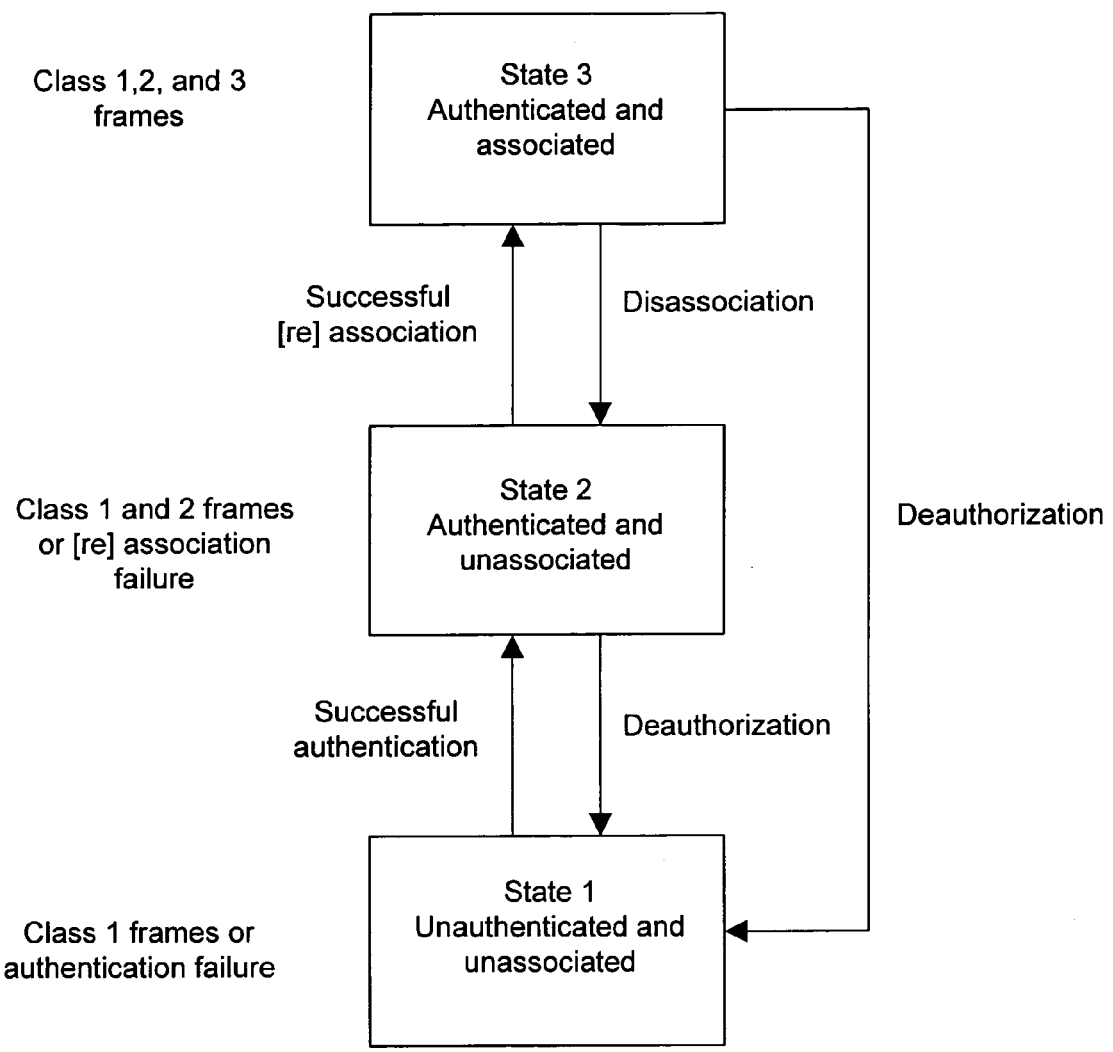
FIG. 2 illustrates a state diagram depicting different states for classes of frames used by a station in the WLAN of FIG. 1 in accordance with the IEEE 802.11 standard.

With reference to FIG. 2, a state diagram is illustrated for frames used by the station 16 in accordance with the IEEE 802.11 standard. When the WLAN 10 comprises an infrastructure BSS, the station 16 may be authenticated or unauthenicated and may be associated or unassociated, resulting in three allowed states: State 1 (initial state; not authenticated and not associated); State 2 (authenticated but not yet associated); and State 3 (authenticated and associated). When the station 16 has been "authenticated" by the AP 18, it has proven its identity to the AP 18. When the station 16 that has been "associated" with the AP 18, it has gained access to network services. The station 16 starts in State 1 and data can be transmitted through the distribution system only in State 3. Disassociation and deauthorization reduce States. State 3 presupposes that the WLAN 10 is an infrastructure BSS as illustrated in FIG. 1. When the WLAN 10 comprises an independent BSS, there are no APs or no associations; hence, only State 2 is reached by the stations 16.

In the IEEE 802.11 standard, frames may be divided into different classes: Class 1 frames may be transmitted in State 1; Class 1 and 2 frames in State 2; and Class 1, 2 and 3 frames in State 3. Management frames categorized as Class 1 frames include, but are not limited to, Probe Request, Probe Response, Beacon, Measurement Pilot (proposed for IEEE 802.11k) authentication, deauthentication and Announcement Traffic Indication Message (ATIM) frames. In general, management frames perform supervisory functions; they are used to join and leave wireless networks and move associations from AP to AP when there is more than one AP. An Action Frame may be a management frame which is used to exchange radio resource measurement, radio resource requirement, network information, and network optimization control in IEEE 802.11 amendments (11k, 11h, 11e, and 11i, for example). The term "Action Frame" is defined in IEEE 802.11e (version D4.0 of November, 2002).

As previously described, IEEE 802.11 management frames include a plurality of parameters that are not protected in the prior art. For example, Beacon and Probe Response frames may be used to advertise a BSS' capability, network information, and required configuration for a station. These frames contain unprotected parameters providing valuable wireless network information and are subject to forgery. Additionally, another management frame, a Measurement Pilot frame, is proposed for IEEE 802.11k and contains unprotected parameters with similar information needing protection. In one illustrative case, the consequences of a forged Beacon or Probe Response frame may create a denial-of-service attack. For instance, if Quality of Service (QoS) capability bit in one of these frames is forged, the station 16 may have to transfer voice traffic as best effort traffic and lead to poor Voice over Internet Protocol (VoIP) quality.

Referring back to FIG. 1, the station 16 in search of connectivity (roaming) first locates a compatible wireless IEEE 802.11 network to use for access. Beacon frames may announce the existence of a network and may be transmitted at regular intervals, referred to as Beacon intervals, to allow the station 16 to find and identify a network, as well as to match parameters joining the network. In an infrastructure BSS, the AP 18 may be responsible for transmitting the Beacon frames. Also, the station 16 may use Probe Request frames to scan an area for existing IEEE 802.11 networks. If the Probe Request encounters a network with compatible parameters, the network (e.g., AP 18) may send a Probe Response frame. In the infrastructure BSS, an AP may send the Beacon or Probe Response frame. In an independent BSS, responsibility for Beacon transmission is distributed among the stations.

With reference to FIG. 1, a management frame 24 may be generated at the AP 18 in an infrastructure BSS and then is transmitted from the AP 18 via the wireless medium 14 to the station 16. The management frame 24 may be a Beacon, a Probe Response, a Measurement Pilot or a like Class 1 management frame. In general, such frames may have one or more unprotected parameters having at least network capability information which needs protection. In either the infrastructure or independent BSS embodiment, the WLAN 10, according to various embodiments of the present invention, supplements the current IEEE 802.11 standard by protecting information parameters within frame components of the management frame 24 using a two-stage protection scheme to be described hereinafter. In one embodiment, these information parameters may be contained within the frame body of the management frame 24. This protection of the parameters may be assisted by initially categorizing the parameters within a frame body of the management frame 24 into two categories: static parameters and dynamic parameters. More specifically, the static parameters may be parameters that are not updated. In general, static parameters may be used for a roaming station 16 to join network. Dynamic parameters may be parameters that are updated. In general, the dynamic parameters may be used by a station (a roaming station as well as an associated station) for wireless network operation and maintenance.

Depending upon the embodiment, the above-described two categories of parameters, static and dynamic parameters, may be separately treated under the two-stage protection scheme (a first stage and a second stage) to provide protection against forgery, in accordance with various embodiments of the present invention. The two stages will now be discussed.

In the first stage, a subset or all of the unprotected parameters of the management frame 24, depending upon the embodiment, may be selected ("selected protected parameters") and added to a modified Message 3 frame (packet) of a four-way handshake used in a key distribution process defined in IEEE 802.11i. This modified Message 3 frame, which is protected by encryption, may be conveyed by the AP 18 to the station 16. Upon receipt of the selected protected parameters in the modified Message 3 frame by the station 16, the station 16 may compare the selected protected parameters with the corresponding unprotected parameters previously conveyed from the AP 18 to the station 16 in the management frame 24. In this comparison, each selected protected parameter of the Message 3 frame should match a corresponding unprotected parameter of the management frame 24 unless there is a forgery or transmission error.

The selected protected parameters may be selected from the previously described static and dynamic unprotected parameters of the frame 24. The selected protected parameters may be parameters that are anticipated not to change between their transmission in the management frame 24 and their transmission in the Message 3 of the four-way handshake unless there is a forgery or transmission error. Hence, in a first embodiment, the selected protected parameters may comprise just the static parameters. In a second embodiment, the selected protected parameters may comprise the static parameters and the dynamic parameters as they were transmitted in the management frame and retransmitted in the Message 3. In this embodiment, the unprotected dynamic parameters transmitted in the management frame 24 may be stored at the AP 18 at least until conveyed in the Message 3 frame. Basically, these values of the dynamic parameters are frozen in time between the transmissions for the purpose of comparison, even though their values may have been updated by the AP 18 prior to the Message 3 frame transmission. In a third embodiment, the selected protected parameters may comprise the static parameters and those dynamic parameters that cannot be updated until after the Message 3 frame has been conveyed, even though they may be updated after the Message 3 frame. Thereafter, the selected protected parameters received during the key distribution process (Message 3 frame) may be compared with the corresponding unprotected parameters previously received in the management frame 24 to see whether they match. A match of all the corresponding parameters allows the authentication and association processes to proceed.

In the second stage of the protection scheme, the updated dynamic parameters may be conveyed from the AP 18 to the station 16 in a new protected action frame, which will be referred to as a "dynamic parameters action frame", that is protected by encryption. This dynamic parameters action frame may be transmitted after the four-way handshake and may be used to update previously received dynamic parameters, such as when there is a policy change. Next, the categorization of these parameters of the management frame 24 into static and dynamic parameters will now be discussed in detail with respect to FIG. 3. Thereafter, the two-stage protection scheme and how it fits into the existing IEEE 802.11 protocol will be discussed in more detail.

Figure 3:
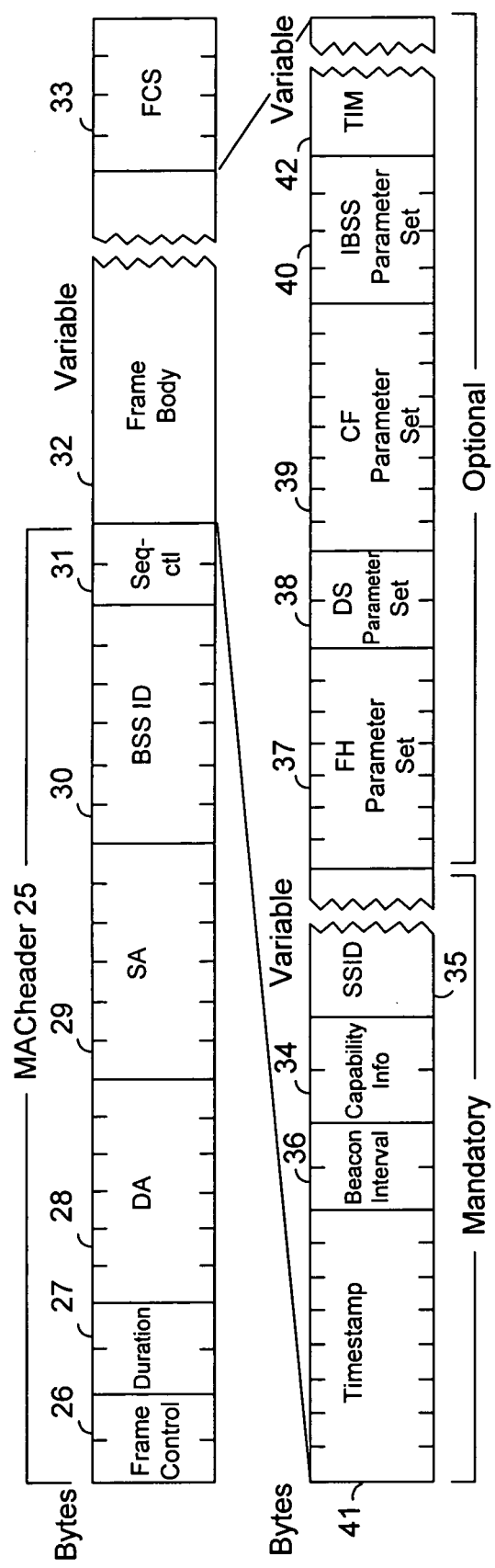
FIG. 3 illustrates a management frame in the form of a Beacon frame in accordance with the IEEE 802.11 standard.

With reference to FIG. 3, the management frame 24 of FIG. 1 may be illustrated by a Class 1 Beacon frame. The Probe Response frame may carry all the parameters of the Beacon frame; however, the Probe Response frame does not need the Traffic Indication Message (TIM) parameter. The management frame 24 may have an 802.11 MAC header 25, which may include a Frame Control field 26, a duration/identification (ID) field 27; a Destination Address (DA) field 28; a Source Address field 29, a BBS ID field 30, and a Sequence Control (Seq-ctl) field 31. A Frame Body 32 may follow the MAC header 25 and a Frame Check Sequence (FCS) 33 may follow the Frame Body 32. The MAC header 25 may be the same for all management frames 24, whereas the management frames 24 may use the Frame Body 32 to transmit information specific to the management frame subtype.

As previously mentioned, in the WLAN 10 of FIG. 1, according to one embodiment of the present invention, the parameters of the management frame 24 of FIG. 3 may be categorized into static and dynamic parameters. The Frame Body may use (a) frame components having fixed-length fields, referred to as "fixed fields", and (b) frame components having variable-length fields, referred to as "Informational Elements" (IEs). Regardless of whether the information parameters are in fixed fields or in IEs, they will be generically referred to as "parameters" or "information parameters". In FIG. 3, the IEEE 802.11 Frame Body may included fixed field frame components having the parameters of a timestamp, a Beacon interval and Capacity Information, with the rest of the frame components of the Frame body contain variable-field IE parameters, as indicated by the designation of "Variable". As shown in FIG. 3, the information parameters also may be grouped as mandatory parameters or optional parameters under the current versions of IEEE 802.11. Moreover, new IE parameters may be defined by newer revisions to the IEEE 802.11 standard.

In one embodiment, the static parameters may include Capability Information 34, Service Set Identifier (SSID) 35, Beacon Interval 36, physical (PHY) parameter sets and like parameter elements. The SSID parameter 35 may identify the IEEE 802.11 network. The physical set parameters may include frequency hoping (FH) parameter 37 to join a frequency-hoping IEEE 802.11 network; a direct-sequence (DS) parameter set 38 for a DS IEEE 802.11 network having only one parameter—the channel number used by the network; and contention-free (CF) parameter 39 which is transmitted in Beacons by APs that support contention-free operation. The static parameters may also include independent BSS (IBSS) Parameter Set 40. In some management frames, a support rates parameter (not shown), which may be characterized as a static parameter, may be used to specify the data rates that the IEEE 802.11 network supports.

In one embodiment, the dynamic parameters may include the Timestamp 41, Traffic Information Map (TIM) 42, and an Enhanced Distributed Channel Access (EDCA) parameter set (not shown) established in IEEE 802.11e. For example, the EDCA parameter set may be used by the QoS-enabled access point (QAP) to establish policy (by changing default Management Information Base [MIB] attribute values), to change policies when accepting new stations or new traffic, or to adapt to changes. The MAC for IEEE 802.11e may provide a Quality-of-Service (QoS) for multiple contending stations and define a hybrid coordination function (HCF), with the contention based channel access mechanism in HCF being called EDCA. A central controller, referred to as the QAP, may be used to set up peer-to-peer communications and to allocate and reserve collision free periods for the stations.

The two stage protection scheme, according to the various embodiments of the present invention, may be extended to other Class 1 management frames 24 which need protection from forgery including, but not limited to, the Probe Response frame and the Measurement Pilot frame. In general, the management frames which may be protected by two-stage protection scheme, according to the various embodiments of the present invention, may have at least the Capacity Information parameters or like capacity information. Although the Capacity Information differs between different subtypes of management frames, in general this Capacity Information, a static parameter, is used to advertise the networks capabilities. In one embodiment, the Capacity Information may include: ESS/IBSS (specifies type of BSS), Privacy (selects WEB—Wired Equivalent Privacy), Short Preamble (added to support high end Direct-Sequence Spread Spectrum [DSSS] PHY), PBCC (added to support high end DSSS PHY), Channel Agility (added to support high end DSSS PHY), Contention-free polling bits, and (QoS) capability bit.

The management frame 24 may take the form of other management frames currently subject to draft amendments to IEEE 802.11 and currently being considered but have not been adopted. Also, the management frame 24 may include Class 1 management frames that are designed in the future for amendments to the IEEE 802.11 standard not currently under consideration. For example, management frame 24 may take the form of the Measurement Pilot frame currently proposed in a draft version of IEEE 802.11k. The Measurement Pilot frame, as currently proposed, may include the following parameters: Capacity Information (static parameters), Measurement Pilot Interval (static parameter), Beacon Interval (static parameter), RSN Capabilities (static parameters), DS Parameter Set (static parameter), Timestamp (dynamic parameter), County String (dynamic parameter), Max Regulatory Power (dynamic parameter), Max Transmit Power (dynamic parameter), and Transceiver Noise Floor (dynamic parameter). As currently proposed, the Capacity Information includes ESS/IBSS, Privacy, Short Preamble, PBCC, Channel Agility, (QoS) capability, CF Pollable, CF Poll Request, Spectrum Management, Shot Slot Time, Radio Measurement, DSSS-Orthogonal Frequency Division Multiplexing (OFDM), Delayed block Ack and Intermediate Block Ack.

Figure 4:
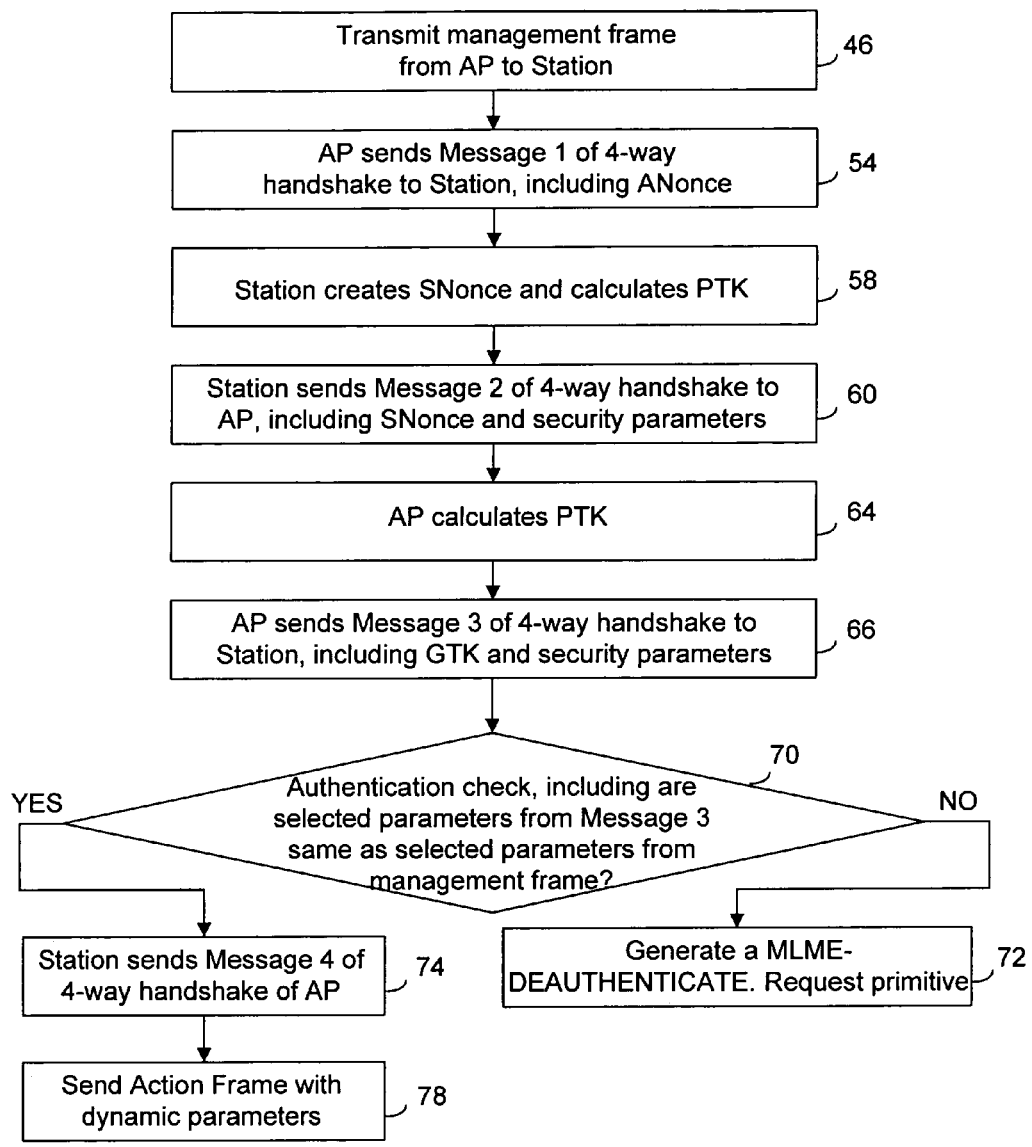
FIG. 4 illustrates a flow chart of selected operations of the access point and station for the WLAN of FIG. 1 in accordance with one embodiment of the present invention.

Referring to FIGS. 1 and 4, the two-stage protection scheme from forgery of the selected parameters, in accordance with the various embodiments of the present invention, will be described next. One of the purposes of the previously-referenced "four-way handshake" is to establish cryptographic session keys, which may be used to protect subsequently transmitted data packets. The IEEE 802.11i four-way handshake procedure is described in an April 2004 publication of "IEEE Standard for Information technology—Part 11: Wireless Medium Access Control (MAC) and Physical Layer (PHY) specifications: Amendment 6: Medium Access Control (MAC) Security Enhancements". Although the four-way handshake may be an IEEE 802.11i exchange, the exchange protocol may be implemented using IEEE 802.11X messages. In one embodiment according to the present invention, only the message 3 frame of the four-way handshake is modified to convey the selected parameters for the first stage of the protection scheme. Message frames 1, 2 and 4 of the four-handshake may remain unmodified from those currently specified in IEEE 802.11i.

With respect to IEEE 802.1X, the station 16 is referred to as a "supplicant" and the AP 18 is referred to as an "authenticator". The authenticator is coupled to the authentication server 20. The supplement seeks access to network resources, network access is controlled by the authenticator, and any incoming requests are passed on to the authentication server for actual processing. The supplicant authenticates with the authentication server through the authenticator. In IEEE 802.1X, the authenticator enforces authentication, but the authenticator doesn't need to do the authentication. Instead the authenticator may exchange the authentication traffic between the supplicant and the authentication server. IEEE 802.1X provides a framework to transmit key information between authenticator and supplicant, but not between the authenticator and authentication server. However, Radius may be used between authenticator and authentication server. As previously mentioned, when the WLAN 10 is configured to be an infrastructure BSS as shown in FIG. 1, the supplicant is the station 16 and the authenticator is the AP 18. However, when the WLAN 10 is configured to be an independent BSS (a plurality of stations 16 and no APs), then both the supplicant and the authenticator may be stations 16. In other words, in WLANs using independent BSS, the station may take the role of supplicant and authenticator. One of the components of the IEEE 802.11 management architecture is a System Management Entity (SME). The SME incorporates the method by which stations interact with the IEEE 802.11 network interface and gather information about its status.

An IEEE 802.11i Extensible Authentication Protocol over LANs (EAPOL)-key exchanges between the supplicant and authenticator may use a number of keys and have a key hierarchy to divide up initial key material into useful keys. Two key hierarchies may include a pairwise key hierarchy and a group key hierarchy, with their keys being used in the EAPOL-key exchanges. In the IEEE 802.11i specification, EAPOL-key exchanges are referred to as the four-way handshake and the group key handshake, with the four-way handshake being described hereinafter. The starting point of the pairwise key hierarchy is the pairwise master key (PMK). When IEEE 802.1X is being used, the PMK may come from the authentication server. When a preshared key is being used, IEEE 802.11i may provide for a way in which a password may be mapped into a PMK. A pseudorandom function uses the PMK and other parameters to create a pairwise transient key (PTK). Some of the other parameters may be: the supplicant's MAC address, the authenticator's MAC address, a nonce from the authenticator (ANonce), and a nonce from the supplement (SNonce). The PTK may be divided into three keys. The first key is the EAPOL-key confirmation key (KCK). The KCK may be used by the EAPOL-key exchanges to provided data origin authenticity. The second key is the EAPOL-key encryption key (KEK). The KEK may be used by the EAPOL-key exchanges to provide for confidentiality. The third key is the temporal key, which may be used by the data-confidentiality protocols. One such data-confidentiality protocol is Counter-Mode/CBC-MAC Protocol (CCMP) which handles frame authentication as well as encryption. For confidentiality, CCMP uses Advanced Encryption Standard (AES). With this background, the four-way handshake, as used in the WLAN according to the various embodiments of the present invention, will now be described in detail.

Referring to FIGS. 1 and 4, at a starting point shown in these FIGS, the AP 18 needs to authenticate itself to the station 16 and keys to encrypt data need to be derived. In one embodiment, an earlier EAP exchange may be used to provide a shared secret key Pairwise Master Key (PMK). Generally, this key may be used during an entire session and generally may be exposed as little as possible by establishing another key, the Pairwise Transient Key (PTK). At 50 in FIG. 4, the AP 18 sends to the station 16 a management frame 24.

At 54 in FIG. 4, a Message 1 frame of the four-way handshake, referred to by reference number 56 in FIG. 1, may be sent from the AP 18 to the station 16, allowing the authenticator to send the supplicant a nonce (ANonce). At 58 of FIG. 4, the station 16 may create its nonce (SNonce) and calculate the PTK. At 60 of FIG. 4, the station 16 may send a Message 2 frame of the four-way handshake, referred to by reference number 62 in FIG. 1, to AP 18 with the Message 2 frame including the SNonce and security parameters. The security parameters may include a Message Integrity Code (MIC), which is an electronic signature. At 64 in FIG. 4, the AP 18 may construct the PTK and the entire message may be subject to an authentication check at the AP 18 using the KCK from the pairwise key hierarchy. In other words, the AP 18 may verify that the information, including the security parameters sent, is valid.

At 66 of FIG. 4, the AP 18 may send the four-way handshake message 3 frame, referred to by reference number 68 in FIG. 1, to the station 16, which may include a Group Temporary Key (GTK) and security parameters encrypted using the KEK. The security parameters may include a MIC. In accordance to one embodiment of the present invention, the message 3 frame is modified to include the selected parameters.

At 70 in FIG. 4, the received message 3 frame may be subjected to an authentication check by the station 16, which allows the station 16 to verify that the information from the AP 18 is valid. In accordance with one embodiment of the present invention, the SME of the station 16 may validate the previously-received selected parameters of the management frame 24 against the selected parameters received in Message 3 frame. If the values of the two sets of selected parameters do not match, the station 16 may conclude that the static parameters of the management frame 24 to have been modified. More specifically, if the selected parameters from the AP 18 are not verified, then at 72 in FIG. 4 the station may generate a MLME-DEAUTHENTICATE.request primitive to break the association between the station 16 and the AP 18. Additionally, a security error may be logged at this time. If the selected parameters from the AP 18 are verified, then at 74 in FIG. 4, a Message 4 frame of the four-way handshake, referred to by reference 76 in FIG. 1, may be sent from the station 16 to the AP 18 to indicates that the temporal keys are now in place to be used by the data-confidentiality protocols.

At 78 of FIG. 4, an action frame 80 of FIG. 1, referred to as a dynamic parameter action frame, may be generated by the AP 18 and transmitted to the station 16. The dynamic parameter action frame may be used to update the dynamic parameters, such as when there is a policy change. In one embodiment, the action frame 80 may be a protected, broadcast frame for carrying the dynamic parameters. For an infrastructure BSS, the action frame may be a Class 3 frame (see FIG. 2). The action frame 80 may be used by the AP 18 to convey dynamic parameters to an enabled station 16. Since broadcast frame is sent at State 3 (State 2 for an independent BSS), it may be protected by the protection scheme established after the previously mentioned four-way handshake. More specifically, as described above, the protected action frame may be encrypted by AES using CCMP.

Figure 5:
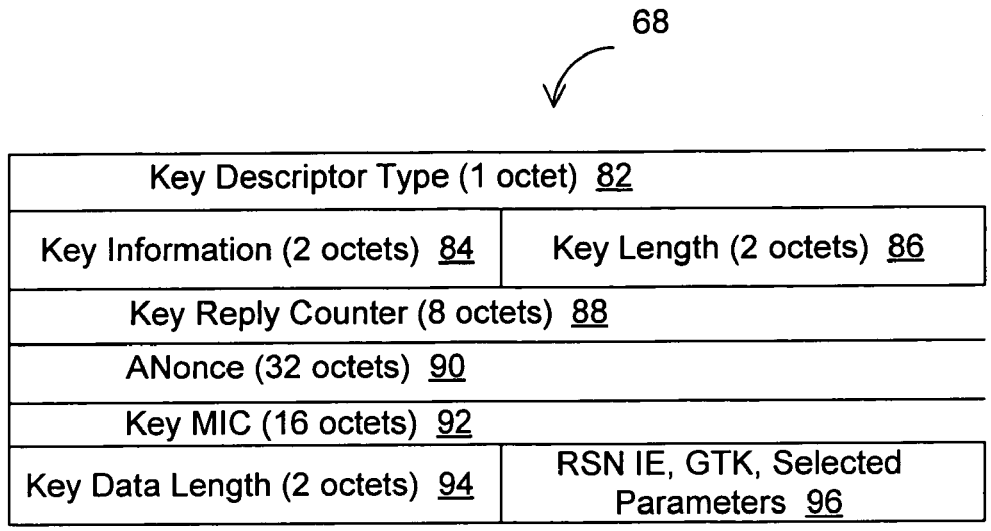
FIG. 5 illustrate a message 3 frame of the four-way handshake defined in IEEE 802.11i, which is modified to convey selected parameters in accordance with one embodiment of the present invention.

Referring to FIG. 5, an illustrative message 3 frame, identified by reference number 68 in FIG. 1, of the four-way handshake is shown. The message 3 may be an EAPOL-Key frame with the Key Type subfield (part of Frame Control field) set to 1. Not all the illustrated fields may be used in the Message 3 frame. The Message 3 may include the following fields: Key Descriptor Type 82; Key Information 84; Key Length 86; Key Replay Counter 88; ANonce 90; Key MIC 92; Key Data Length 94; and a key data field 96, which may included Robust Security Network (RSN) IE and GTK, all of which are specified in the IEEE 802.11i. The Key Data field 96 may contain one or two RSN information elements. If a group cipher has been negotiated, this field 96 also may include an encapsulated GTK. This field 96 may also be encrypted if a GTK is included. In the Key Data field 96, the SME of the AP 18, in accordance with one embodiment of the present invention, may insert the selected parameters, which it also provided to the station 16 in its previously transmitted management frame 24. In other words, in addition to the RSN information elements and GTK in Key Data field 96, the Key Data field 96 may be modified to insert the selected parameters defined above in the message 3 frame shown in FIG. 5.

Figure 6:
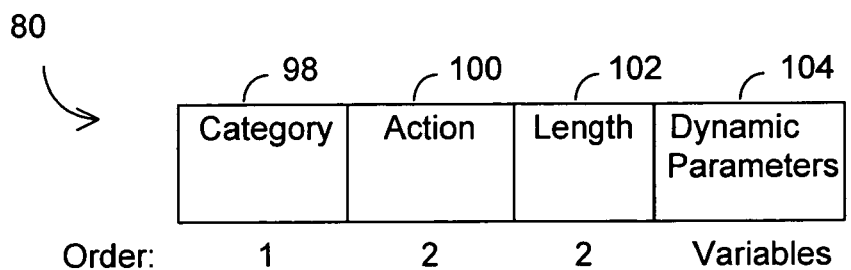
FIG. 6 illustrates an action frame designed to carry dynamic parameters in accordance with one embodiment of the present invention.

Referring to FIG. 6, the action frame, identified by reference number 80 in FIG. 1, is illustrated with the following fields: category 98, action 100, length 102, and, according to one embodiment of the present invention, a field 104 for the dynamic parameters. As defined in 802.11e, the body of the action frame 80 has a set of sub-fields, several of which are reserved for future expansions of the standard. The first three fields are fixed length, with the field 104 for the dynamic parameters being variable-length. The interval of the action frame 80 may be equal to or greater than the Beacon Interval. The station 16 may read the dynamic parameters only from the action frame 80 once the station 16 has associated with the AP 18. In one embodiment, the action frame 80 may be encrypted, since it is being transmitted after completion of the four-way handshake. In another embodiment, the action frame 80 may be protected by using the protection schemes to be adopted by IEEE 802.11w.

The WLAN 10 of FIG. 1, according to one embodiment of the present invention, may provide backward compatible with non-802.11w devices and forward compatible with future or new information parameters. No new key hierarchy is needed.

Figure 7:
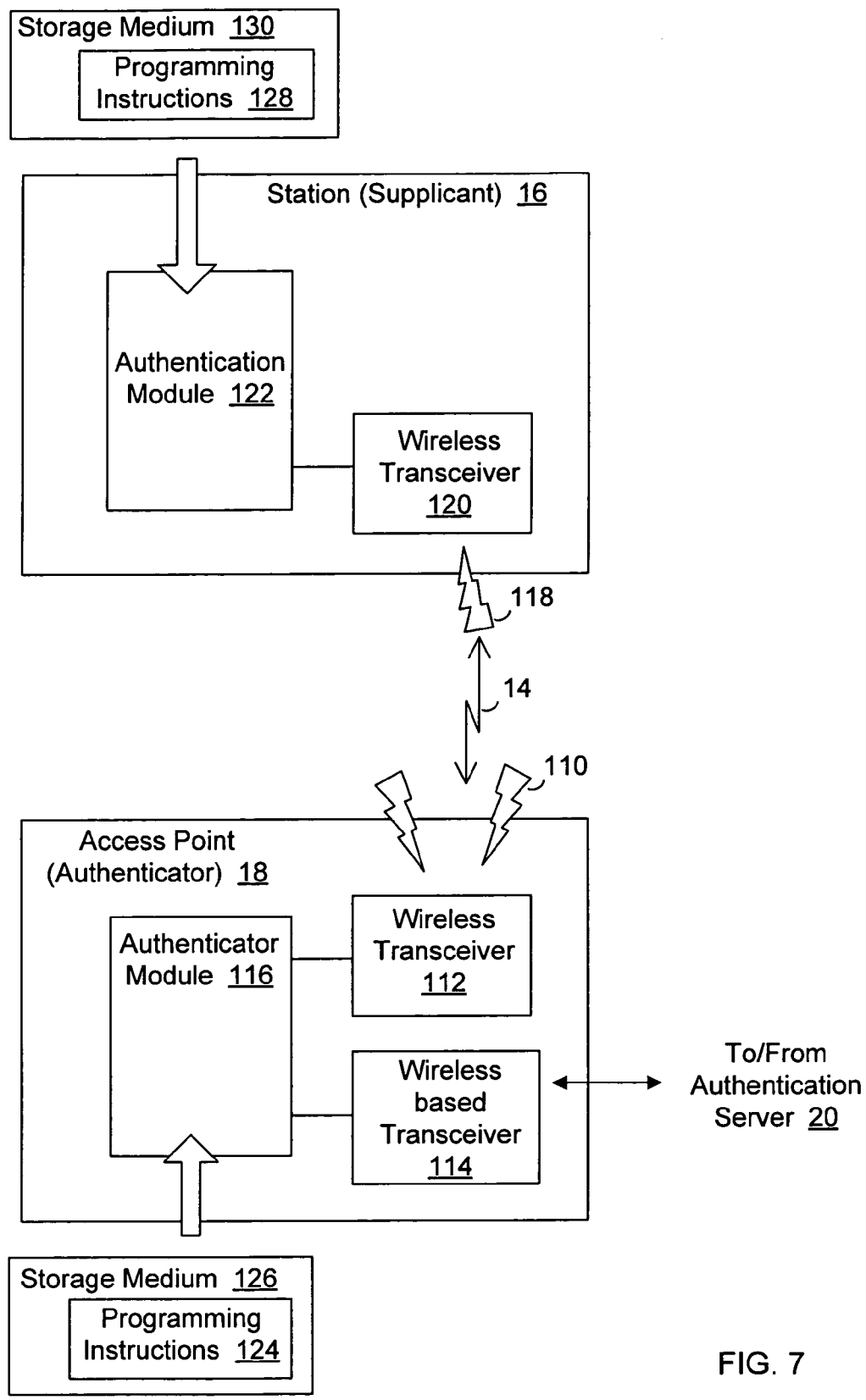
FIG. 7 illustrates the WLAN of FIG. 1 in further detail, including an article having programming instructions configured to enable the station to practice an applicable portion of the method of the present invention, in accordance with various embodiments.

FIG. 7 illustrates the station 16 and the AP 18 of FIG. 1 in further detail, including an article having programming instructions designed to enable the station 16 and the AP 18 to practice applicable portion of the method of the present invention, in accordance with various embodiments, is illustrated. For the embodiments, AP 18 may include a number of omnidirectional antennas 110, a wireless transceiver 112, a wireline based transceiver 114 and an authenticator module 116, coupled to each other as shown. In alternate embodiments, at least one of transceivers 112 and 114 may be implemented with a separate transmitter and receiver instead. Further, AP 18, in particular, in other embodiments, may further include other components not shown.

Omnidirectional antennas 110 and wireless transceiver 112 are configured to facilitate communication over the wireless medium 14 with a supplicant, such as, the station 16, as earlier described. The wireline based transceiver 112 is configured to facilitate communication with the authentication server 20 as earlier described. The authenticator module 116 is configured to practice the protection method earlier described.

For the embodiments, the station 16 may include an antenna 118, a wireless transceiver 120, and an authentication module 122, coupled to each other as shown. In alternate embodiments, the transceiver 120 may be implemented with a separate transmitter and receiver instead. Further, the station 16, in particular, in other embodiments, may further include other components not shown. The antenna 118 and wireless transceiver 120 are configured to facilitate communication over the wireless medium 14 with an authenticator, such as, the AP 18, as earlier described.

In various embodiments, the station 16 and the AP 18, including authenticator module 116 and authentication module 122 respectively, are configured to practice the corresponding applicable portions of the method of the present invention by programming instructions 124 stored in a storage medium 126 in the AP 18 and programming instructions 128 stored in a storage medium 130 in an article in the station 16. In various embodiments, authenticator module 116 together with one or more both transceivers 112 and 114 may be embodied in a chipset or a single integrated circuit. In various embodiments, the authentication module 122 together with the transceivers 120 may be embodied in a chipset or a single integrated circuit. In various embodiments, the authenticator module 116 together with one or more or both transceivers 114 and 116 may be embodied in a microprocessor. In various embodiments, the authentication module 122 together with the transceiver 120 may be embodied in a microprocessor.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is manifestly intended that this invention be limited only by the claims and the equivalents thereof.

What is claimed is:

1. An apparatus comprising:
   a receiver of a station configured to receive, from an access point when the station is in an unassociated and unauthenticated state with respect to the access point, a wireless communication including a beacon frame or a probe response frame having a first plurality of parameters related to network capability information, and to receive, from the access point during a four-way handshake key distribution process, a message 3 frame of the four-way handshake including a second plurality of parameters corresponding to at least a subset of the first plurality of parameters related to network capability information contained in the beacon frame or the probe response frame;
   an authentication module coupled to the receiver to compare respective ones of the second plurality of parameters with corresponding ones of the first plurality of parameters to determine whether they are the same; and
   a transmitter coupled to the authentication module and configured to transmit data in response to a determination that the respective ones of the second plurality of parameters and the corresponding ones of the first plurality of parameters are same.

2. The apparatus according to claim 1 further comprising a transmitter configured to terminate an association with the access point in response to a determination that at least one of the second plurality of parameters and the corresponding one of the first plurality of parameters are not the same.

3. The apparatus according to claim 1, wherein the first plurality of parameters related to network capability information received by the receiver in the wireless communication include a first plurality of static parameters and a first plurality of dynamic parameters.

4. The apparatus according to claim 3, wherein the receiver is further configured to receive, from the access point, another wireless communication including an action frame having a second plurality of dynamic parameters after the station is in an associated and authenticated state with respect to the access point, the second plurality of dynamic parameters corresponding to at least a subset of the first plurality of dynamic parameters related to network capability information, and at least one of the second plurality of dynamic parameters of the action frame including an updated value of one of the first plurality of dynamic parameters.

5. The apparatus according to claim 3, wherein the at least a subset of the first plurality of parameters includes the first plurality of static parameters.

6. The apparatus according to claim 4, wherein the at least a subset of the first plurality of parameters includes the first plurality of static parameters and the first plurality of dynamic parameters.

7. The apparatus according to claim 4, wherein the action frame has a format in accordance with IEEE 802.11e.

8. The apparatus according to claim 4, wherein the receiver is further configured to receive a message 1 frame of the four-way handshake which includes a first nonce, the transmitter is configured to transmit after the message 1 frame a message 2 frame of the four-way handshake which includes a second nonce and a first security parameter, the receiver is further configured to receive after the message 2 frame in the message 3 frame of the four-way handshake which includes the second plurality of parameters, a group temporary key and a second security parameter; and the transmitter is further configured to transmit a message 4 frame of the four-way handshake which includes an acknowledgement.

9. The apparatus according to claim 4, wherein the second plurality of parameters are a plurality of encrypted parameters and the action frame is an encrypted action frame.

10. A method comprising:
receiving, by a receiver of a station, an unencrypted wireless communication from an access point including a management frame having a first plurality of parameters related to network capability information, wherein the management frame comprises a beacon frame or a probe response frame;
receiving, by the receiver of the station, during a four-way handshake key distribution process, a message 3 frame of the four-way handshake including a second plurality of parameters corresponding to at least a subset of the first plurality of parameters related to network capability information contained in the beacon frame or the probe response frame;
comparing respective ones of the second plurality of parameters with the corresponding ones of the first plurality of parameters to determine whether they are the same; and
terminating an association with the access point in response to a determination that that at least one of the second plurality of parameters and the corresponding one of the first plurality of parameters are not the same, or establishing an association with the access point in response to a determination that the respective ones of the plurality of second parameters and the corresponding ones of the plurality of first parameters are the same.

11. The method according to claim 10, wherein the first plurality of parameters related to network capability information received by the receiver include a first plurality of static parameters and a first plurality of dynamic parameters.

12. The method according to claim 11, further comprises:
after determining that the respective ones of the second plurality of parameters and the corresponding ones of the first plurality of parameters are the same and after establishing the association with the access point, receiving another wireless communication including an action frame having a second plurality of dynamic parameters corresponding to at least a subset of the first plurality of dynamic parameters, and at least one of the second plurality of dynamic parameters of the action frame including an updated value of the corresponding one of the first plurality of dynamic parameters.

13. The method according to claim 11, wherein the at least a subset of the first plurality of parameters includes the first plurality of static parameters.

14. The method according to claim 12, wherein the at least a subset of the first plurality of parameters includes the first plurality of static parameters and the first plurality of dynamic parameters.

15. The method according to claim 12, wherein the action frame having a format in accordance with IEEE 802.11e.

16. The method according to claim 12, further comprising:
receiving a message 1 frame of the four-way handshake which includes a first nonce;
after receiving the message 1 frame, conveying a message 2 frame of the four-way handshake which includes a second nonce and a first security parameter; after conveying the message 2 frame, receiving the message 3 frame of the four-way handshake which includes the second plurality of parameters, a group temporary key and a second security parameter; and
after receiving the message 3 frame, conveying a message 4 frame of the four-way handshake which includes an acknowledgement.

17. The method according to claim 12, wherein the second plurality of parameters is a plurality of encrypted parameters and the action frame is an encrypted action frame.

18. An article comprising a non-transitory storage medium; and a plurality of instructions stored in the non-transitory storage medium, the plurality of instructions designed to enable an apparatus to receive an unencrypted wireless communication including a management frame having a first plurality of parameters related to network capability information; to receive, during a four-way handshake key distribution process, a message 3 frame of the four-way handshake including a second plurality of parameters corresponding to at least a subset of the first plurality of parameters related to network capability information contained in the management frame; to compare respective ones of the second plurality of parameters with corresponding ones of the first plurality of parameters to determine whether they are the same; and to generate an indication based on said determination; wherein the management frame comprises a beacon frame or a probe response frame.

19. The article according to claim 18, wherein the first plurality of parameters related to network capability information are to include a first plurality of static parameters and a first plurality of dynamic parameters.

20. The article according to claim 19, wherein the plurality of instructions are further designed to receive, after determining that the respective ones of the second plurality of parameters and the corresponding ones of the first plurality of parameters are the same, another wireless communication including an action frame having a second plurality of dynamic parameters corresponding to at least a subset of the first plurality of dynamic parameters, and at least one of the second plurality of dynamic parameters of the action frame including an updated value of the corresponding one of the first plurality of dynamic parameter.

21. A system, comprising:
a plurality of omnidirectional antennas;
an authenticator wireless transmitter coupled to the antennas and configured to transmit to a supplicant an unencrypted wireless communication including a management frame having a first plurality of parameters related to network capability information, wherein the management frame comprises a beacon frame or a probe response frame;

a wireline based transceiver configured to transmit and receive data from an authentication server; and an authenticator module coupled to the authenticator transmitter and the transceiver to access one or more security parameters from the authenticator server to generate a second plurality of parameters corresponding to at least a subset of the first plurality of parameters related to network capability information contained in the management frame, and to transmit via the authenticator transmitter to the supplicant, during a four-way handshake key distribution process, a message 3 frame of the four-way handshake including the second plurality of parameters.

22. The system according to claim 21, wherein the supplicant includes an authentication module to compare respective ones of the second plurality of parameters with corresponding ones of the first plurality of parameters to determine whether they are the same, and a supplement transmitter, coupled to the authentication module, to send an acknowledgement to the system if they are the same.

23. The system according to claim 22, wherein the first plurality of parameters related to the network capability information include a first plurality of static parameters and a first plurality of dynamic parameters.

24. The system according to claim 22, wherein the authenticator module is further configured to transmit via the authenticator transmitter, after the transmission of the acknowledgment, another wireless communication including an encrypted action frame having a second plurality of dynamic parameters corresponding to at least a subset of the first plurality of dynamic parameters, and at least one of the second plurality of dynamic parameters of the encrypted action frame including an updated value of the corresponding one of the first plurality of dynamic parameters.

25. The system according to claim 24, wherein the action frame having a format in accordance with IEEE 802.11e.

26. The system according to claim 24, wherein the authenticator module is further configured to transmit via the authenticator transmitter to the supplicant a message 1 frame of the four-way handshake which includes a first nonce; the supplicant, after receiving the message 1 frame, is configured to transmit via the supplicant transmitter to the system a message 2 frame of the four-way handshake which includes a second nonce and a first security parameter; the authenticator module, after receiving the message 2 frame, is further configured to transmit via the authenticator transmitter the message 3 frame of the four-way handshake which includes the second plurality of parameters, a group temporary key and a second security parameter; and the supplicant, after receiving message 3 frame, is further configured to transmit via the supplement transmitter to the system a message 4 frame of the four-way handshake which includes the acknowledgement.

27. The apparatus of claim 1, wherein the receiver is further configured to receive the second plurality of parameters during a point in the key distribution process that occurs after a negotiation of a group cipher and an encrypted key data field includes the second plurality of parameters and a group temporary key.

28. The apparatus of claim 3, wherein the first plurality of static parameters comprise a Beacon Interval and a Physical parameter set further including a frequency hopping (FH) parameter, a direct-sequence (DS) parameter, a channel number used by a network, a contention free (CF) parameter and an Independent BSS (IBSS) parameter set.

29. The apparatus of claim 3, wherein the first plurality of dynamic parameters related to network capability information comprise a Timestamp, a Traffic Information Map (TIM), and an Enhanced Distribution Channel Access (EDCA) parameter set established in IEEE 802.11e.

30. The apparatus of claim 3, wherein the second plurality of parameters received in the message 3 frame of the four-way handshake correspond to at least a subset of the first plurality of static parameters.

31. The apparatus of claim 3, wherein the second plurality of parameters received in the message 3 frame of the four-way handshake correspond to at least a subset of the first plurality of dynamic parameters that are not anticipated to change between the first wireless transmission and the second wireless transmission unless there is a forgery or transmission error.

* * * * *

UNITED STATES PATENT AND TRADEMARK OFFICE
CERTIFICATE OF CORRECTION

PATENT NO. : 7,890,745 B2  Page 1 of 1
APPLICATION NO. : 11/330568
DATED : February 15, 2011
INVENTOR(S) : Emily H. Qi et al.

It is certified that error appears in the above-identified patent and that said Letters Patent is hereby corrected as shown below:

Column 13

Line 27, "24. The system according to claim 22,..." should read --24. The system according to claim 23,...--.

Signed and Sealed this
Eleventh Day of September, 2012

David J. Kappos
*Director of the United States Patent and Trademark Office*